(12) United States Patent
Hendrix

(10) Patent No.: US 6,690,142 B2
(45) Date of Patent: Feb. 10, 2004

(54) DC—DC CONVERTER

(75) Inventor: Machiel Antonius Martinus Hendrix, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/095,555

(22) Filed: Mar. 12, 2002

(65) Prior Publication Data

US 2002/0131278 A1 Sep. 19, 2002

(30) Foreign Application Priority Data

Mar. 16, 2001 (EP) .......................................... 01000058

(51) Int. Cl.⁷ ................................................ G05F 1/10
(52) U.S. Cl. ..................................................... 323/222
(58) Field of Search .................................. 323/220, 222, 323/223, 225; 363/84, 89, 125, 127

(56) References Cited

U.S. PATENT DOCUMENTS

| | | | |
|---|---|---|---|
| 5,980,095 A | 11/1999 | Asplud et al. | 364/528.21 |
| 6,194,880 B1 | 2/2001 | Fraidlin et al. | 323/222 |
| 6,282,109 B1 * | 8/2001 | Fraidlin et al. | 363/89 |
| 6,320,357 B1 * | 11/2001 | Peters et al. | 323/222 |
| 6,445,140 B2 * | 9/2002 | Buij et al. | 315/291 |

* cited by examiner

*Primary Examiner*—Matthew V. Nguyen

(57) ABSTRACT

A boost-converter comprising an inductor, a switch operated by a high-frequency control signal with a frequency f and a diode, is equipped with a further switch operated by a high-frequency control signal with a frequency f and a further diode. The further switch and the further diode enable the conductor to carry current in two directions in each period of the control signal. A high power factor and low THD can be obtained while the frequency f can be maintained at a constant value over a wide range of the amplitude of the input voltage. Hard switching is prevented.

6 Claims, 3 Drawing Sheets

DC—DC CONVERTER

BACKGROUND OF THE INVENTION

The invention relates to a DC—DC converter for generating a higher, second DC voltage from a first DC voltage, which converter comprises
- a first input terminal which is to be connected to the positive pole of a voltage source supplying the first DC voltage,
- a second input terminal which is to be connected to the negative pole of the voltage source supplying the first DC voltage,
- a first branch which interconnects the input terminals and comprises a series arrangement of an inductive element L and a switching element S1,
- a control circuit, which is coupled to a control electrode of the switching element S1, and which is intended to generate a control signal for rendering the switching element S1 conducting and non-conducting,
- a second branch which connects a point of the first branch between the inductive element L and the switching element S1 to the second input terminal, and which comprises a series arrangement of a unidirectional element D1 and an output capacitor C1.

The invention also relates to a circuit arrangement for feeding a discharge lamp.

A DC—DC converter as mentioned in the opening paragraph is commonly referred to as up-converter or boost-converter and is frequently applied in, for example, electronic ballast circuits for feeding a discharge lamp. The known DC—DC converter is frequently operated in the so-termed "critical mode". This means that, in each period of the control signal, the switching element is rendered conducting during a constant time interval. Subsequently, the switching element is rendered non-conducting, after which it is rendered conducting again as soon as the current through the inductive element has become equal to zero. Operating said converter in the "critical mode" has the advantage that the power dissipation in the unidirectional element is comparatively small while, at the same time, the frequency of the control signal is comparatively high, so that the inductive element L can be chosen to be comparatively compact.

The known DC—DC converter is frequently applied in, for example, electronic ballast circuits for feeding a discharge lamp. In this application, and in many other applications, the first DC voltage is generally formed by a full-wave rectified low-frequency AC voltage supplied by the mains. To satisfy statutory requirements regarding power factor and THD, it is necessary for the current drawn from the mains by the DC—DC converter to be an alternating current having the same frequency and approximately the same shape as the low-frequency AC voltage. In addition, this current must be in phase with the low-frequency AC voltage. In the case of the known DC—DC converter, which is operated in the "critical mode", these two requirements cause the frequency with which the control signal renders the switching element conducting and non-conducting to depend very substantially on the instantaneous amplitude of the low-frequency AC voltage and the power drawn from the output capacitor. In practice it has been found that the integrated circuits that are generally applied in the control circuits of the known DC—DC converter set a practical limit to the frequency of the control signal. At frequencies above this limit, instabilities occur in the operation of the DC—DC converter that may lead to damage. As a result of this limit the DC—DC converter must be designed such that, even in the vicinity of the zero crossings of the low frequency AC voltage and at a small value of the power supplied by the DC—DC converter, the frequency of the control signal does not go beyond this limit. As a result, the frequency of the control signal is comparatively low at a comparatively high instantaneous amplitude of the low-frequency AC voltage and a comparatively high value of the power supplied by the DC—DC converter. This means that, for example, the inductive element L must be chosen to be comparatively large, which causes the DC—DC converter to become voluminous and expensive. Another drawback of the known DC—DC converter resides in that "hard switching" occurs if the instantaneous amplitude of the first DC voltage is higher than half the voltage present across the output capacitor. Hard switching means that the switching element is rendered conducting by the control signal while a comparatively high voltage is present across the switching element. This leads to a comparatively high power dissipation in the switching element, which may also cause damage to the switching element.

RELATED ART

U.S. Pat. No. 6,194,880 (Fraidlin et al.) discloses a DC—DC converter in which current flows bi-directionally through a boost inductor.

SUMMARY OF THE INVENTION

It is an object of the invention to provide a DC—DC converter wherein hard switching is effectively counteracted, and which can be embodied so as to be comparatively compact and inexpensive.

To achieve this, a DC—DC converter as mentioned in the opening paragraph is characterized in accordance with the invention in that the DC—DC converter is further provided with
- a third branch which comprises a further unidirectional element D2, and which connects the second input terminal to a point of the first branch between the inductive element L and the switching element S1,
- a fourth branch which shunts the unidirectional element D1, and which comprises a further switching element S2 a control electrode of which is coupled to the control circuit,
- and in that the control circuit is provided with means for alternately rendering the switching element S1 and the further switching element S2 conducting and non-conducting with a frequency f, thereby causing the current through the inductive element L to change direction twice in each period of the control signal.

By virtue of the presence of the further switching element, it is possible to design a DC—DC converter in accordance with the invention in such a manner that hard switching is precluded at any value of the power supplied by the DC—DC converter and at any ratio between the instantaneous amplitude of the first DC voltage and the voltage across the output capacitor. It has also been found that if the DC—DC converter is fed from a supply voltage source supplying a low-frequency AC voltage, the frequency of the control signal does not have to be changed over a large range of both the power supplied by the DC—DC converter and the instantaneous amplitude of the first DC voltage to meet high requirements regarding power factor and THD. By virtue thereof, the frequency of the control signal can be chosen to be at a constant high value so that, for example, the inductive element L can be chosen to be small and the DC—DC converter can be embodied so as to be compact and inexpensive.

Said advantages are used in a preferred embodiment of a DC—DC converter in accordance with the invention, wherein the DC—DC converter is additionally provided with

- a fifth branch which comprises an input capacitance and interconnects the first and the second input terminal,
- a rectifier respective output terminals of which are connected to the first and the second input terminal, and which is provided with rectifier input terminals which are to be connected to a supply voltage source supplying a low-frequency AC voltage,
- and the control circuit is provided with means for controlling each one of the switching elements in each period of the control signal in such a manner that the current drawn from the supply voltage source is an alternating current of the same frequency as the low-frequency AC voltage, and is in phase with the low-frequency AC voltage.

This preferred embodiment can very suitably be used in circuit arrangements that are fed from the mains that supply a low-frequency sine-shaped AC voltage.

In a further embodiment of a DC—DC converter in accordance with the invention, the control circuit is provided with

- a microprocessor for generating, in dependence on the instantaneous amplitude of the low-frequency AC voltage and the power drawn from the output capacitor, a first signal that is a measure of the maximum amplitude Ipos of the current through the inductive element L in a first direction, and a second signal that is a measure of the maximum amplitude Ineg of the current through the inductive element L in a second direction,
- a signal generator for generating a signal that is a measure of the instantaneous amplitude of the current through the inductive element L, and
- a driver, coupled to the signal generator and the microprocessor, for rendering the switching element S1 conducting in a time interval wherein the further unidirectional element D2 carries current, and for rendering the switching element S1 non-conducting when the amplitude of the current through the inductive element L is equal to Ipos, and for rendering the further switching element S2 conducting in a time interval wherein the unidirectional element D1 carries current, and for rendering the second switching element non-conducting when the amplitude of the current through the inductive element L is equal to Ineg. The value of Ipos and of Ineg depend substantially on the power supplied by the further preferred embodiment and on the instantaneous value of the first DC voltage. Ipos and Ineg also depend on the frequency f of the control signal and the voltage across the output capacitor. However, the latter are frequently constant. In the further preferred embodiment, the control circuit is embodied, in a comparatively simple and reliable manner, such that the further preferred embodiment has a high power factor and causes only a small quantity of THD.

As a result of the advantageous properties indicated hereinabove, a DC—DC converter in accordance with the invention can very suitably be used in a circuit arrangement for feeding a lamp. This applies, more particularly, when the circuit arrangement is additionally provided with a circuit part for adjusting the power consumed by the lamp. If the power consumed by the lamp can be adjusted over a large range, then the DC—DC converter must be capable of functioning well over a large range of the power supplied. As indicated hereinabove, a DC—DC converter in accordance with the invention is capable of meeting high requirements regarding power factor and THD over a large range of the power supplied and at a constant frequency.

BRIEF DESCRIPTION OF THE DRAWINGS

An example of a DC—DC converter in accordance with the invention will be explained with reference to a drawing. In the drawing.

DETAILED DESCRIPTION OF THE INVENTION

Figure 1:
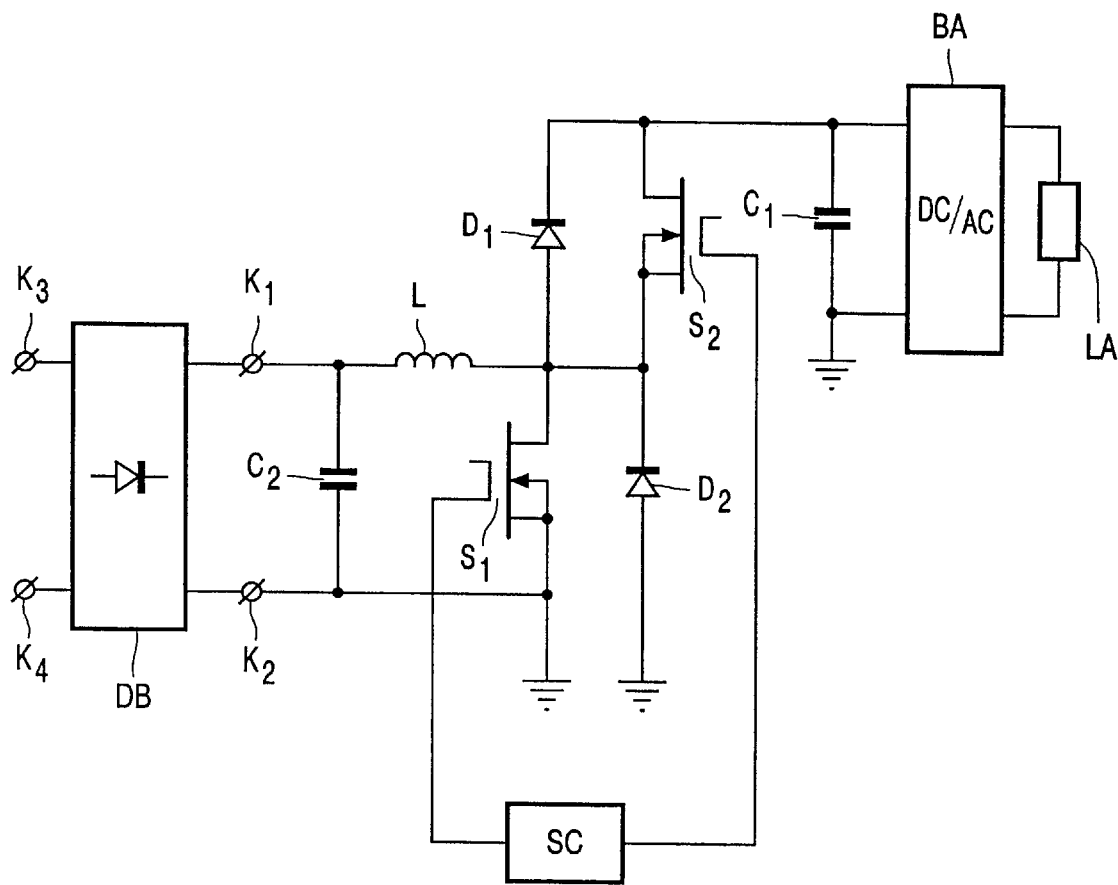
FIG. 1 shows a circuit arrangement for feeding a lamp to which a lamp is connected, and provided with an example of a DC—DC converter in accordance with the invention.

In FIG. 1, K3 and K4 are rectifier input terminals of a rectifier DB which, in this example, is formed by a diode bridge. A first output terminal of rectifier DB is connected to a first input terminal K1 of a DC—DC converter. A second output terminal of rectifier DB is connected to a second input terminal K2 of the DC—DC converter. The first input terminal K1 is connected to the second input terminal K2 by means of a capacitor C2, which, in this example, forms a fifth branch and also an input capacitance. Capacitor C2 is shunted by a series arrangement of coil L and switching element S1, which, in this example, forms a first branch. Coil L forms, in this example, an inductive element L. Switching element S1 is shunted by a series arrangement of diode D1 and capacitor C1 which, in this example, forms a second branch. Diode D1 forms, in this example, a unidirectional element D1, and capacitor C1 forms an output capacitor. Diode D1 is shunted by switching element S2 which, in this example, forms both a further switching element S2 and a fourth branch. Switching element S1 is shunted by diode D2 which, in this example, forms both a further unidirectional element and a third branch. Circuit part SC is a control circuit intended to generate a control signal for alternately rendering switching elements S1 and S2 conducting and non-conducting with a frequency f, in such a manner that the current through coil L changes direction twice in each period of the control signal. To achieve this, a first output of circuit part SC is connected to a control electrode of switching element S1 and a second output of circuit part SC is connected to a control electrode of switching element S2. Control circuit SC, diodes D1 and D2, switching elements S1 and S2, coil L and capacitor C1 jointly form a DC—DC converter. Circuit part BA is a DC/AC converter for generating a high-frequency current from a DC voltage. A first side of capacitor C1 is connected to a first input of circuit part BA, and a second side of capacitor C1 is connected to a second input of circuit part BA. A first output of circuit part BA is connected, by means of a lamp LA, to a second output of circuit part BA.

It is noted that the diodes D1 and D2 can be omitted if the switching elements S1 and S2 are embodied so as to be switching elements comprising an internal diode such as, for example, MOSFETs.

The operation of the example shown in FIG. 1 is as follows.

If the rectifier input terminals K3 and K4 are connected to the poles of a supply voltage source supplying a low-frequency AC voltage, then this AC voltage is rectified by the rectifier DB. As a result, a full-wave rectified AC voltage is present between the first and the second input terminal. The control circuit SC renders the switching elements S1 and S2 alternately conducting and non-conducting, as a result of which a DC voltage is present across capacitor C1. The circuit part BA generates a high-frequency current from this DC voltage, which high-frequency current is fed to the lamp LA.

Figure 2:
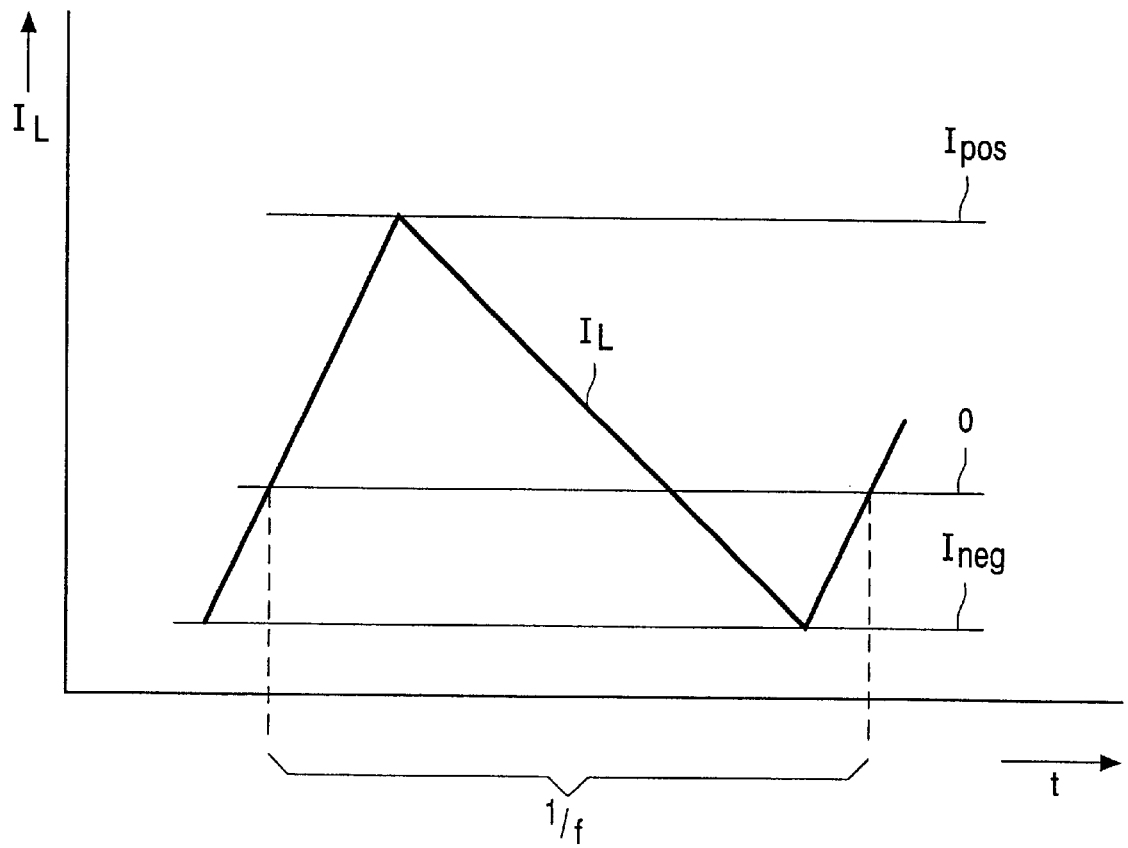
FIG. 2 shows the shape of the current through an inductive element that forms part of the example shown in FIG. 1.

In FIG. 2, the time is plotted, in arbitrary units, along the horizontal axis. The current is plotted, in arbitrary units, along the vertical axis. IL is the shape of the current through coil L in the example shown in FIG. 1. The time interval between the vertical dashed lines is equal to a period of the current through coil L and also to a period of the control signal generated by the circuit part SC. In this period, four successive phases can be distinguished. During the first and the second phase, the current flows through coil L in the direction of a junction point of switching element S1 and diode D1. During the first phase, the current increases from zero to the maximum amplitude Ipos. During this first phase, the first switching element is conducting, as a result of which a voltage is present across the coil which is equal to the instantaneous amplitude of the full-wave rectified AC voltage. The figure shows that the current through coil L increases linearly from zero to Ipos. As soon as the current through coil L reaches the value Ipos, the circuit part SC renders the circuit element S1 non-conducting and the second phase begins. During this second phase, diode D1 is conducting and the amplitude of the current decreases from Ipos to zero. A voltage is present across the coil L, which is equal to the voltage across capacitor C1 (hereinafter referred to as Vbus) minus the instantaneous amplitude of the full-wave rectified low-frequency AC voltage. The circuit part SC renders the switching element S2 conducting sometime during the second phase. When the current through the coil L has become equal to zero, the diode no longer carries current, and the switching element S2 starts carrying current. This is also the beginning of the third phase. During the third and the fourth phase, the current flows through coil L in the direction of capacitor C2. As in the second phase, in the third phase the voltage across the coil is equal to Vbus minus the instantaneous amplitude of the full-wave rectified low-frequency AC voltage. During the third phase, the current in coil L increases linearly from zero to Ineg. When the current through the coil has become equal to Ineg, the circuit part renders switching element S2 non-conducting, and D2 becomes conducting. This also marks the beginning of the fourth phase. During the fourth phase, the voltage across the coil is equal to the instantaneous amplitude of the full-wave rectified AC voltage, and the current through the coil decreases from Ineg to zero. The circuit part SC renders the switching element S1 conducting sometime during the fourth phase. When the current through coil L has become equal to zero, diode D2 stops conducting, switching element S1 becomes conducting, and the first phase of the next period of the current through coil L begins. Both at the beginning of the first phase and at the transition from the second to the third phase, the current through coil L changes direction. The average value of the current (t) drawn from the supply voltage during this high-frequency period is (Ipos−Ineg)/2. If the low-frequency AC voltage supplied by the supply voltage source is given by $V(t)=V_m \sin(\omega_m t)$ and the requirement is imposed that I(t) is sine-shaped with the same frequency as the low-frequency AC voltage and, in addition, is in phase with the low-frequency AC voltage (in other words $I(t)=I_m \sin(\omega_m t)$), it can be derived for the maximum coil currents Ipos and Ineg that $$Ipos = a_0 + (a_1+a_2)\sin(\omega_m t) - a_0 \cos(2\omega_m t)$$

and $$Ineg = a_0 + (a_1-a_2)\sin(\omega_m t) - a_0 \cos(2\omega_m t)$$

Where $a_0=-V_m^2/(4Vbus*L*f)$, $a_1=V_m/2Lf$, $a_2=2P_m/V_m$, and $P_m=V_m I_m$.

If the frequency f of the control signal and Vbus are chosen to be constant, then Ipos and Ineg depend exclusively on the value of $\omega_m t$ and the power drawn from the output capacitor C1. The value of $\omega_m t$ is determined by the instantaneous amplitude of the full-wave rectified low-frequency AC voltage. In the control circuit SC, a microprocessor is included, which is not shown in FIG. 1. The microprocessor is coupled to a memory wherein the values of the different parameters in the above formulas for Ipos and Ineg are stored. In addition, at respective inputs of the microprocessor, signals are present which are a measure of, respectively, the instantaneous value of the amplitude of the low-frequency AC voltage and the adjusted value of the power supplied by the DC—DC converter. Using the above formulas for Ipos and Ineg, the microprocessor continuously calculates the values of Ipos and Ineg by means of the values of the parameters and the signals present at the respective inputs. In this manner, it is achieved that the circuit part SC renders the switching elements S1 and S2 conducting and non-conducting in such a manner that a high power factor and a small amount of THD is obtained. By choosing a constant value for the frequency of the control signal, it is achieved that the coil used can be compact and that the circuit arrangement can be embodied so as to be compact.

It is noted that a signal that is proportional to the sum of the first and the third term of the above formulas of Ipos and Ineg can be obtained by means of low-frequency filtering the full-wave rectified low-frequency voltage. Thus, the values of Ipos and Ineg can also be obtained by adding a term that is directly proportional to the instantaneous amplitude of the low-frequency AC voltage to the result of this low-frequency filtering. This method of generating signals that are a measure of Ipos and Ineg can be applied by means of comparatively simple electronic means.

Figure 3B:
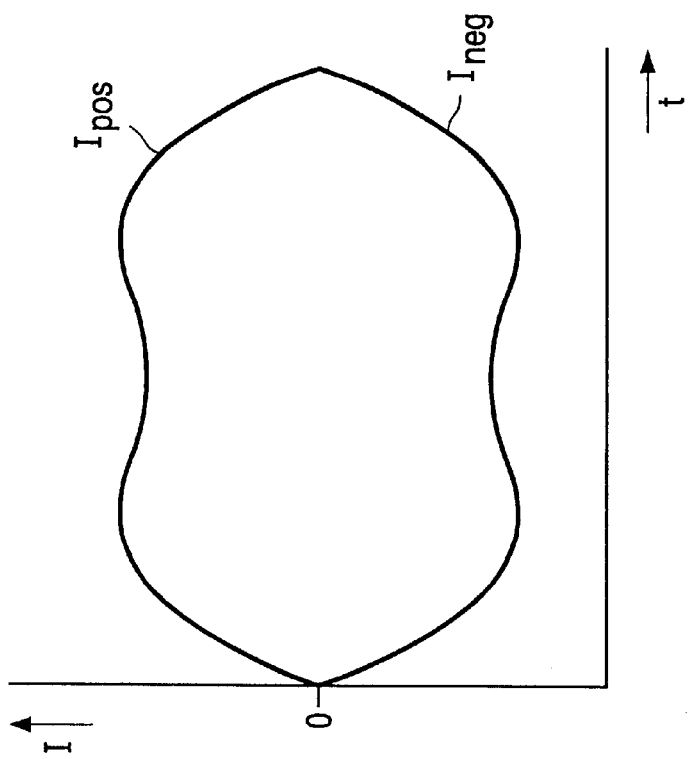
FIG. 3 shows, for two different lamp power levels, the envelope of the current through the inductive element during a half period of a low-frequency AC voltage supplied to the example shown in FIG. 1 by a supply voltage source.
Figure 3A:
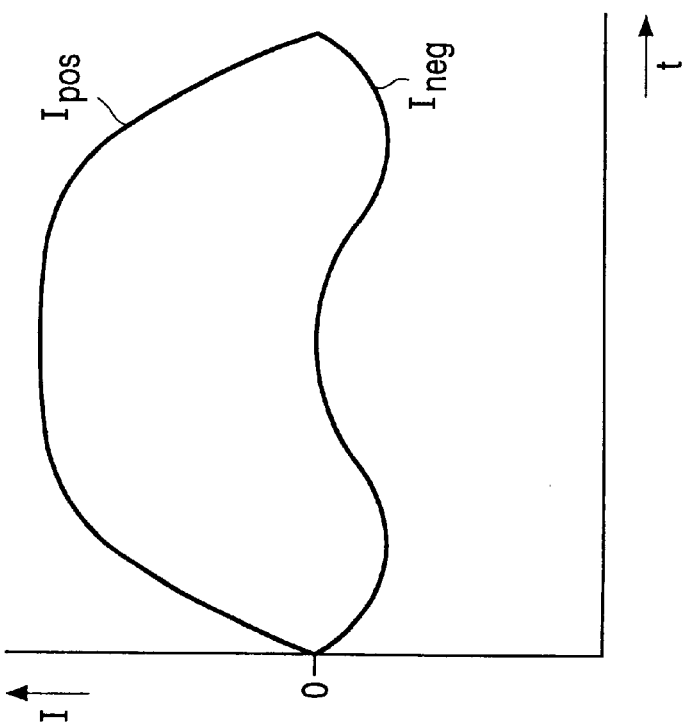

In FIG. 3a and FIG. 3b, the time is plotted, in arbitrary units, along the horizontal axis. The current is plotted, in arbitrary units along the vertical axis. FIG. 3a shows the envelope of the current in coil L in the example shown in FIG. 1 during a half period of the low-frequency AC voltage supplied by the supply voltage source. In other words, FIG. 3a shows Ipos and Ineg as a function of time for a half period of the low-frequency AC voltage. As regards FIG. 3a, the power drawn from the supply voltage source is approximately 160 watts. The Figure shows that Ipos is larger than Ineg substantially throughout the range of the half period of the low-frequency AC voltage as a result of the fact that the average value of the current drawn from the supply voltage source is comparatively high. FIG. 3b also shows the shape of Ipos and Ineg as a function of time for a half period of the low-frequency AC voltage. In the case of FIG. 3b, the power drawn from the supply voltage source is 1 watt. The Figure shows that, in this case, Ipos and Ineg are substantially equal over substantially the entire range of the half period, which can be attributed to the fact that the average current drawn from the supply voltage source has a very mall amplitude.

What is claimed is:

1. A DC—DC converter for generating a higher, second DC voltage from a first DC voltage, which converter comprises a first input terminal which is to be connected to the positive pole of a voltage source supplying the first DC voltage, a second input terminal which is to be connected to the negative pole of the voltage source supplying the first DC voltage, a first branch which interconnects the input terminals and comprises a series arrangement of an inductive element L and a switching element S1, a control circuit, which is coupled to a control electrode of the first switching element S1, and which is intended to generate a control signal for rendering the switching element S1 conducting and non-conducting, a second branch which connects a point of the first branch between the inductive element L and the switching element S1 to the second input terminal, and which comprises a series arrangement of a unidirectional element <<D1>> D1 and an output capacitor C1, characterized in that the DC—DC converter further comprises a third branch which comprises a further unidirectional element D2, and which connects the second input terminal to a point of the first branch between the inductive element L and the switching element S1, a fourth branch which shunts the unidirectional element <<D1>> D1, and which comprises a further switching element S2 a control electrode of which is coupled to the control circuit, and wherein the control circuit renders the switching element S1 conductive, then non-conductive, and then renders switching element S2 conductive and then non-conductive during a period 1/f, thereby causing the current through the inductive element L to change direction twice in each period of the control signal.

2. A DC—DC converter as claimed in claim 1, wherein the DC—DC converter is additionally provided with a fifth branch which comprises an input capacitance and interconnects the first and the second input terminal, a rectifier respective output terminals of which are connected to the first and the second input terminal, and which is provided with rectifier input terminals which are to be connected to a supply voltage source supplying a low-frequency AC voltage, and the control circuit is provided with means for controlling each one of the switching elements in each period of the control signal in such a manner that the current drawn from the supply voltage source is an alternating current of the same frequency as the low-frequency AC voltage, and is in phase with the low-frequency AC voltage.

3. A DC—DC converter as claimed in claim 1, wherein the frequency f is constant.

4. A DC—DC converter as claimed in claim 2, wherein the control circuit is provided with a microprocessor for generating, in dependence on the instantaneous amplitude of the low-frequency AC voltage and the power drawn from the output capacitor, a first signal that is a measure of the maximum amplitude Ipos of the current through the inductive element L in a first direction, and a second signal that is a measure of the maximum amplitude Ineg of the current through the inductive element L in a second direction, a signal generator for generating a signal that is a measure of the instantaneous amplitude of the current through the inductive element L, and a driver, coupled to the signal generator and the microprocessor, for rendering the switching element S1 conducting in a time interval wherein the further unidirectional element D2 carries current, and for rendering the switching element S1 non-conducting when the amplitude of the current through the inductive element L is equal to Ipos, and for rendering the switching element S2 conducting in a time interval wherein the unidirectional element <<D1>> D1 carries current, and for rendering the switching element S2 nonconducting when the amplitude of the current through the inductive element L is equal to Ineg.

5. A circuit arrangement for feeding a lamp provided with a DC—DC converter as claimed in claim 1.

6. A circuit arrangement as claimed in claim 5, wherein the circuit arrangement is additionally provided with a circuit part for adjusting the power consumed by the lamp.

* * * * *